Aug. 26, 1924.
W. A. HUBENER
ANCHOR BOLT NUT
Filed Dec. 23, 1922
1,506,123
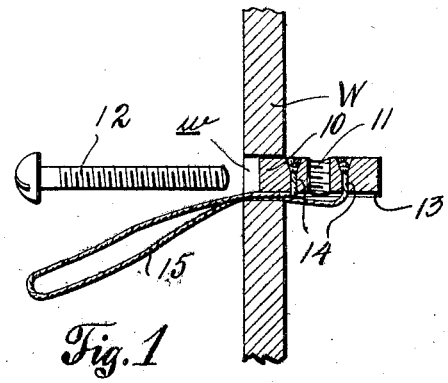
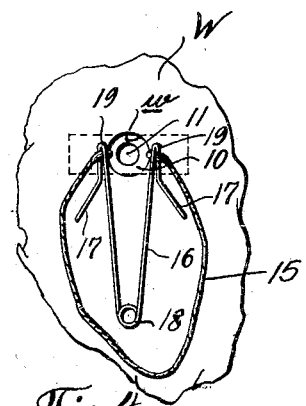
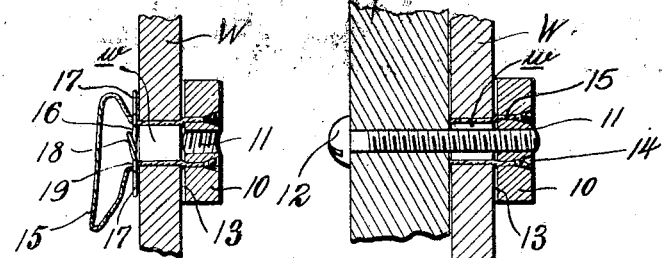
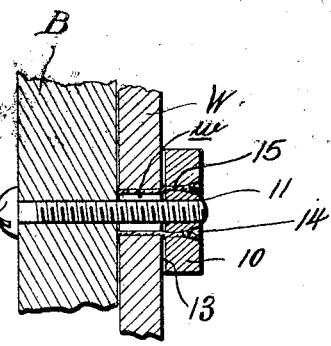
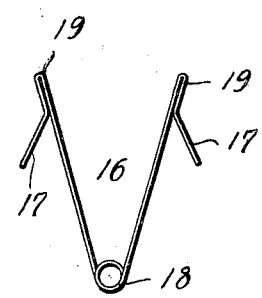
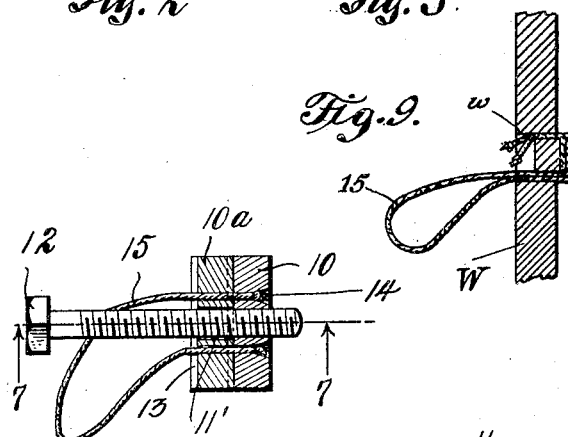
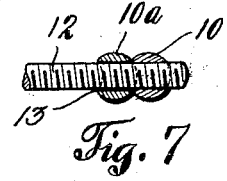
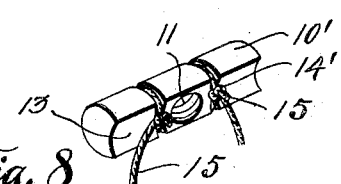
Witness
Nils E. Goodactive
Inventor
W. A. Hubener
By his Attorney Geo. L. Beeler Patented Aug. 26, 1924.

1,506,123

UNITED STATES PATENT OFFICE.

WILLIAM A. HUBENER, OF NEW YORK, N. Y., ASSIGNOR TO DIAMOND EXPANSION BOLT COMPANY, OF NEW YORK, N. Y., A CORPORATION OF NEW YORK.

ANCHOR-BOLT NUT.

Application filed December 23, 1922. Serial No. 608,608.

*To all whom it may concern:*

Be it known that I, WILLIAM A. HUBENER, a citizen of the United States, residing at New York, borough of Manhattan, in the county of New York and State of New York, have invented certain new and useful Improvements in Anchor-Bolt Nuts, of which the following is a specification.

This invention relates to builders' hardware and has particular reference to the construction and manipulation of anchor bolts, such as are commonly used in connection with hollow tile or other analogous wall constructions, where it is impossible for the nut to be applied directly to a bolt from the inside of the wall because of inaccessibility.

Among the objects of the invention is to provide an anchor bolt nut construction that possesses maximum strength and yet is adapted to pass through a hole drilled in the wall very materially smaller than the hole required for other constructions for the accommodation of a nut or anchorage for a bolt of the same diameter. In order words, the hole to be drilled or otherwise formed through the wall in my construction may be said to be but little larger than the diameter of the bolt whereas in the usual construction of anchor bolts the cross sectional area of the hole is about twice that required in my case. As a specific example I may state that for an anchor bolt of $\frac{3}{16}$ of an inch the nut, in accordance with my invention, is only $\frac{5}{16}$ of an inch in diameter and has ample strength, whereas the hole required for other types of anchor bolts in common use must be at least $\frac{7}{16}$ of an inch.

Another object of the invention is to provide a means for inserting a nut from the front of a wall, and by the term wall as used herein I wish to be understood as meaning any structure against the face of which any structural part is to be applied by the use of means inserted or manipulated solely from the front thereof, said manipulating means for the nut being of such a nature as to make it possible to insert a plurality of nuts or a nut and a washer or other reinforcing means for the nut through the same hole and as a part of the same operation.

Another object of the invention is to provide improved means for inserting and manipulating a nut preparatory to inserting a bolt thereinto, said means including a cord or its equivalent with which co-operates a peculiar form of discardable spreader or tension member for holding the nut temporarily centered back of the hole.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a sectional detail view indicating the insertion of a nut through a hole drilled in a wall.

Fig. 2 is a similar view indicating a successive stage of the operation.

Fig. 3 is a similar view indicating the completion of the operation and with a beam or the like anchored to the wall.

Fig. 4 is a face view indicating the action of the tension member in holding the nut temporarily as in the position of Fig. 2.

Fig. 5 is a detail view of the tension member in normal form.

Fig. 6 is a view of a slight modificaton of adaptability but otherwise corresponding to Fig. 2 in character.

Fig. 7 is a sectional view on the line 7—7 of Fig. 6 indicating especially the preferred form of the nut and its adaptability to mate with a companion nut or washer.

Fig. 8 is a detail perspective of a modified form of nut.

Fig. 9 is a slight variation from Fig. 1, indicating the passage of the nut through a relatively small hole and with the cord knots on the outside of the nut.

Referring now more specifically to the drawings I show my improvement as comprising a nut 10 which in the preferred form is simply a suitable length of substantially round or bar metal having a transverse tapped hole 11 in its center for the reception of the threaded end of a screw or bolt 12 of any standard or usual construction. One side or face of the nut may be grooved or recessed as shown at 13 if desired where it is brought against the inner surface of the wall W, among the reasons for which are that the edges of the groove form relatively sharp teeth for engagement with the wall, making a better hold between the nut and the wall and also forming a better seat either against the wall or against another nut or washer as indicated in Fig. 7. I do not wish to be limited in any such detail as to the cross sectional form of either the nut or the groove that may be formed in the face thereof.

On opposite sides of the hole 11 I provide two small drilled holes 14 preferably equally spaced from the hole 11 but arranged either parallel thereto or at any other suitable angle. The space between the ends of the holes 14 where they merge into the groove 13 may not materially exceed the diameter of the nut. The purpose of these holes 14 is for the attachment of a cord 15 or other similar relatively soft flexible member. The inner ends of the holes 14 may be counterbored or flared if desired so that the knots may lie within the surface of the nut. I have found, however, as shown in Fig. 9, that even though the knots may lie on the outside of the nut, when the cord is long enough for the knots to be drawn forward toward the operator away from the nut it may be passed endwise relatively freely through the hole $w$ in the wall, since as shown in Fig. 1 the hole may approximate rather closely the diameter of the nut. In other words, the nut may so closely fit the hole that there would be insufficient room for the passage of the knots unless they be drawn forward toward the cord loop. During this operation the operator with one finger will hold the loop of the cord to prevent the loss of the nut down inside of the wall, while with the other hand he shoves the nut through the hole, completing such action ordinarily by the use of any convenient tool or the threaded end of the bolt.

After the nut is thus forced through the hole $w$ the operator draws forward firmly upon the cord, insuring the seating of the knots into or against the nut, and causing the knotted ends of the cord to bring the nut directly up against the wall back of the hole as shown in Fig. 2 and with the threaded hole 11 thereof properly centered by reason of the fact that the cords will be drawn along the opposite side walls of the hole $w$. While holding the loop end of the cord 15 taut with one finger the operator with his thumb and fingers of the other hand will apply the tension member 16, bringing the open forks 17 thereof over both strands of the loop and then by drawing down firmly on the closed end 18 of the tension member to cause the cords to enter the sharp angles 19 of the member while at the same time he forces the entire tension member firmly against the front face of the wall, the device will be brought into the position of Fig. 4, the two legs of the cord being gripped tightly in the points 19 and with the yoke portion 18 put under strong tension the tendency of the member is to spring apart in the normal position of Fig. 5, whereby the cord is maintained automatically and firmly in the position shown in Fig. 2, holding the nut in place temporarily or until the bolt is inserted. Following this operation the operator of course will apply the beam B or other structural member against the face of the wall, disregarding the cord and fastener 16 at this time, and then he will insert the bolt and tighten it with the use of a tool as will be well understood. The tension member 16 is made of a simple piece of spring wire and is so cheap that it and the cord may be discarded without concern.

It will be noted that while inserting the nut through the hole in the wall the looped portion of the cord will be extended endwise of the nut along the groove or channel 13 formed therein so that if the knots of the cord are countersunk, a cord of considerable size may be employed and yet permit the nut 10 to pass through the hole $w$.

As indicated in Figs. 6 and 7 a plurality of inside fasteners 10 and $10^a$ may be employed, both of which are strung upon the same cord 15. These members may be similar except that the member $10^a$ is preferably provided with a smooth hole 11' instead of being threaded. The insertion of these members through the hole $w$ is the same as above described, first the nut 10 and then the nut or washer $10^a$, the cord of course being long enough to permit sufficient separation of these members along the cord while being inserted. When the operator draws forward on the loop the tension on the cord causes the two members to come together in perfect alignment as shown in Fig. 7 by direct pull on the cord. The tension member 16 is then applied as before stated and the bolt when put into place will act upon the nut 10 the same as in any other case where a washer is used for strengthening purposes.

In the larger sizes of nuts I sometimes prefer to employ the form shown in Fig. 8 in which the nut 10', instead of being pierced for the holes 14, is formed with two circumferential grooves 14' around which the ends of the cord 15 are looped at 15'. The operation for installation and securing of the bolt is the same in both cases.

I claim:

1. In an anchor bolt nut, the combination of a nut with a transverse hole for the passage of a bolt, a flexible pull member attached to the nut for bringing it into securing position, and a temporary tension member applied to said pull member for holding the nut preliminary to the introduction of the bolt.

2. In an anchor bolt fastening means, the combination of a nut of substantially cylindrical form but having formed along one face a channel in the form of a segment of a cylinder adapting the nut to mate with another member of similar construction, said nut having a threaded hole whose axis is perpendicular to the bottom of said groove.

3. The herein described nut for anchor bolts having a transverse hole for the insertion of a bolt and having a looped flexible cord with its ends knotted and slidably secured to the nut on opposite sides of said hole.

4. In an anchor bolt securing means, the combination of a nut projectable endwise through a hole in the wall and having a transverse hole for the insertion of the bolt, and having also a pair of holes on opposite sides of the bolt hole, cord members passed through and secured in said pair of holes for drawing the nut into final position against the inner surface of the wall, and automatic tension means for engagement with the cord members against the front surface of the wall.

5. In an anchor bolt nut, the combination of a nut provided with a transverse threaded hole to engage with a bolt and also provided with one or more countersunk holes to slidably engage with a flexible cord, said cord having knots on its ends adapted to be received in said countersunk holes so that the bolt nut and cord may be received in a hole of minimum diameter.

6. In an anchor bolt the combination of a nut and washer threaded upon a flexible pull member, and a flexible pull member.

7. In an anchor bolt the combination of a nut and washer threaded upon a flexible pull member, and a flexible pull member having its ends passing through both the nut and washer and knotted at its ends to form a loop to be manipulated by the operator in positioning the nut and washer.

In testimony whereof I affix my signature.

WILLIAM A. HUBENER.